United States Patent [19]

Hillyer et al.

[11] 4,038,573
[45] July 26, 1977

[54] COIL TERMINATING MEANS

[75] Inventors: Michael J. Hillyer, Mechanicsburg; Victor J. Madison, Carlisle, both of Pa.

[73] Assignee: General Signal Corporation, Rochester, N.Y.

[21] Appl. No.: 569,918

[22] Filed: Apr. 21, 1975

[51] Int. Cl.² .......................................... H02K 11/00
[52] U.S. Cl. ................................... 310/71; 310/194; 336/192
[58] Field of Search .................... 310/71, 42, 85, 194, 310/260, 270, 179, 180, 214, 217, 259; 336/107, 192, 198; 339/95, 98, 97, 99, 95 D

[56] References Cited

U.S. PATENT DOCUMENTS

| 2,583,804 | 1/1952 | Andrus | 310/71 |
| 3,027,475 | 3/1962 | Gaudry | 310/260 |
| 3,093,433 | 6/1963 | Ege | 339/95 D |
| 3,226,585 | 12/1965 | Roe | 310/194 |
| 3,629,794 | 12/1971 | Kourminsky | 339/95 D |
| 3,646,582 | 2/1972 | Van Alphen | 336/107 |
| 3,725,707 | 4/1973 | Leimbach | 310/71 |
| 3,780,323 | 12/1973 | Swain | 310/71 |
| 3,781,741 | 12/1973 | Weiner | 336/192 |
| 3,963,949 | 6/1976 | Church | 310/71 |

FOREIGN PATENT DOCUMENTS

| 1,056,721 | 5/1959 | Germany | 310/71 |

*Primary Examiner*—R. Skudy
*Attorney, Agent, or Firm*—Milton E. Kleinman; George W. Killian

[57] ABSTRACT

A terminal board is provided for terminating the coil ends of a winding on an electric motor or other wound coil. The terminal board comprises a unitary structure which overlays the coil supporting structure. In a preferred embodiment, the terminal board will comprise supporting structure for multiple groups of terminals. A wing member joins together the supporting structure for each group of terminals to make a unitary terminal board. In a preferred embodiment, the terminal board is first retained in position by press fitting a boss on the underside of the terminal board into a mating hole in the supporting structure. The coils cooperate with a portion of the terminal board to provide a second retention means. The wing members comprise a thin wall structure which extends normal to the mounting plane and provides a barrier to retain the individual windings of the coils within a predetermined space. The terminals are not included on the terminal board structure when it is first mounted. The terminal inserted in each well includes slots which are sized to engage the ends of the coil windings, pierce the insulation and provide mechanical and electrical connection to the wires. The terminal is adapted to make connection to an external wire which may be inserted into the terminal in the same direction that the terminal was inserted in the well. The terminals of the terminal board may also be adapted to make connections with projections from another terminal board which may overlay the first terminal board and may include a brush assembly. At a subsequent stage of assembly, the boss, which first held the terminal board, may be knocked off.

14 Claims, 5 Drawing Figures

U.S. Patent  July 26, 1977  4,038,573
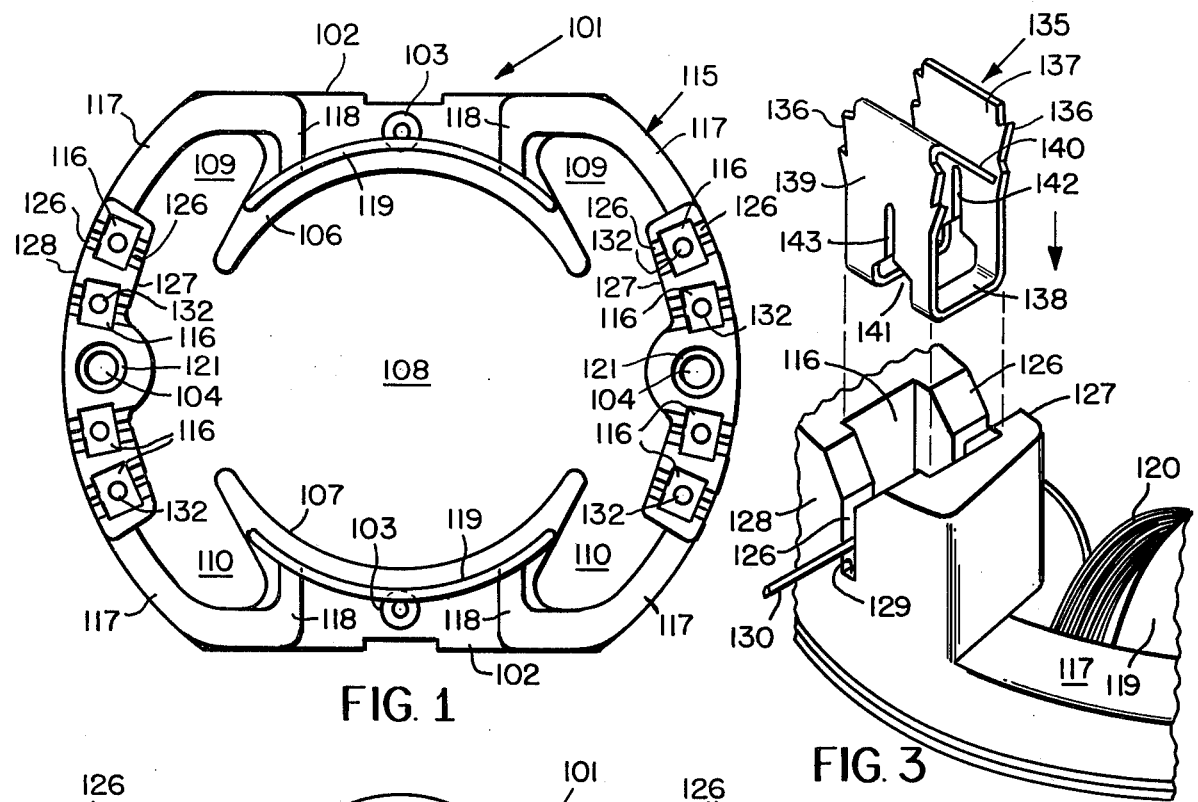
FIG. 1
FIG. 3
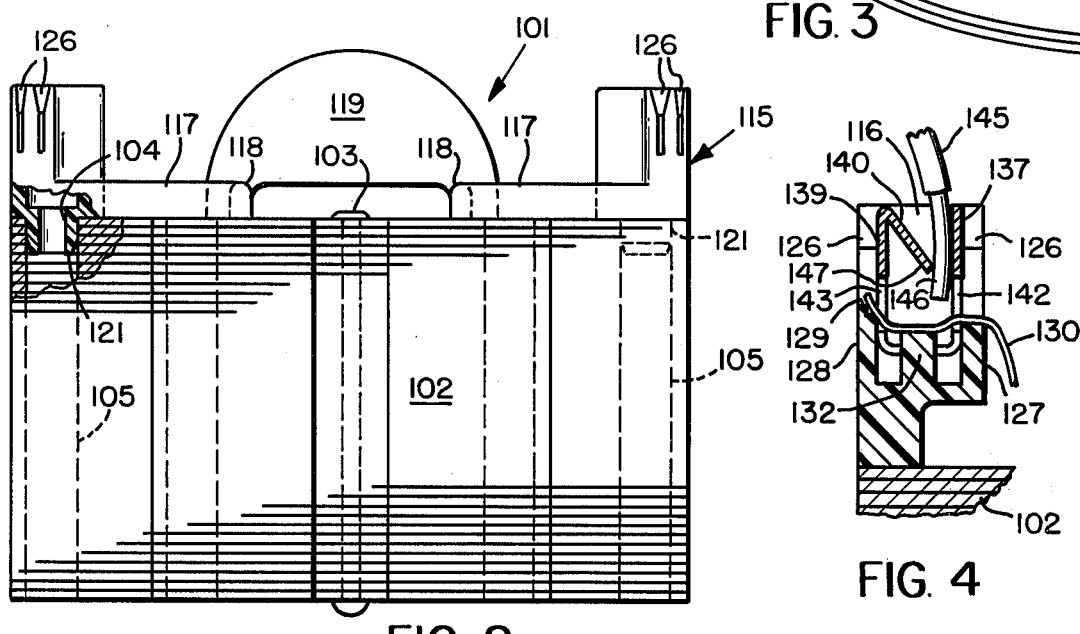
FIG. 2
FIG. 4
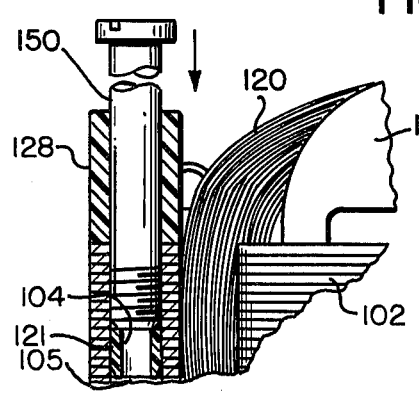
FIG. 5

COIL TERMINATING MEANS

BACKGROUND OF THE INVENTION

The invention disclosed herein was conceived in connection with an effort to manufacture small electric motors more efficiently and economically. However, the principles may be used in the assembly of transformers, inductors and other devices such as relays which require the winding of wire on a form. For many years, machines have been used for winding wire on various forms. After the winding has been completed, the machine severs the wound coil from the supply reel, and as a result the last turn, or few turns, may tend to loosen. Accordingly, the next stage of production usually requires a manual operation wherein a worker must manually tighten the loosened turn, or turns, and apply some form of tape or harness to retain the individual turns in the desired position. In addition, it is common practice to manually strip the end of the wound wire of its enamel insulation and connect a heavier duty flexible wire to facilitate making external connections. The connection is manually insulated and placed in a position to provide mechanical and electrical protection. These costly manual steps tend to slow down the assembly process and frequently require a substantial number of skilled dexterous workers. Various techniques have been developed to try to eliminate, or at least minimize manual operations. For example, U.S. Pat. No. 3,725,707 issued Apr. 3, 1973, to Leimbach et al and entitled Field Sub-assembly for Universal Electric Motors discloses a special terminal board and terminal which eliminates much of the hand labor of the prior art. However, the Leimbach et al. patent requires a more complicated coil winding machine in that the starting end and terminating end of the coil must be laid in a channel of a terminal and the channel crimped prior to the time that the wound coil is severed from the supply reel.

The teachings of the present invention overcomes the disadvantages of the prior art and does not require a more complex coil winding machine.

SUMMARY OF THE INVENTION

The present invention employs a terminal receiving member as a part of the sub-assembly on which the coil is wound. The terminal receiving member includes a well into which a terminal may be inserted subsequent to the winding and at a different assembly station. In a preferred embodiment, opposite faces of the well include funnel shaped slots into which the starting and terminating ends of the coil are laid by the coil winding machine. The slot dimensions are chosen to constitute a press fit for the wire. Thereafter, the wound coil may be severed from the supply reel without any danger of any portion of the wound coil coming loose. The sub-assembly including the wound coil, may subsequently be transferred from the coil winding machine to a terminal inserting machine. The terminal inserting machine inserts a terminal into the well to make electrical contact with the coil ends laid in the slot of the well. As a simultaneous operation, any excess wire projecting beyond the boundary of the well may be severed and discarded. The terminal is designed to accommodate another connection constituting a wire for external connections and which is inserted into the terminal and clamped thereby.

The assembly, including the terminal receiving well, may overlay the form on which the coil is to be wound in such manner that the winding of the coil helps to retain the terminal receiving member in a predetermined position. In addition, the terminal receiving member may include a portion, or portions, that will assist in retaining the wound coil within predetermined space limits. One form of the terminal receiving member includes a boss for securing the terminal receiving member to the form on which the coil is wound before the coil is wound. After the coil is wound, the boss may be knocked off if it is expedient to do so. The well into which the terminal is inserted includes a projecting member, or anvil, which helps to provide support for the wire as the terminal is inserted.

It is an object of the invention to provide a new and improved means for terminating the ends, and center taps if used, of coils.

It is a more specific object of the invention to provide a means for capturing and retaining ends and/or taps from a wound coil so that the ends and/or taps will be securely retained in a predetermined position subsequent to the winding of the coil and the removal of the sub-assembly from that production stage.

It is another object of the invention to provide a terminal board which may be secured by a first holding means to the form on which the coil is to be wound.

It is another object of the invention to provide a terminal board which is retained on the form by the wound coil after it is wound.

It is another object of the invention to provide a structure wherein the first holding means may be broken off to facilitate a subsequent assembly step.

It is another object of the invention to retain the ends and/or taps of the wound coil in a predetermined location to facilitate the insertion of terminals in the terminal board for making contact with the coil ends.

It is another object of the invention to provide a terminal which makes contact with the coil ends and/or taps and into which another wire may be inserted for making external connections.

It is another object of the invention to provide a terminal which may be adapted to receive connections from another sub-assembly.

BRIEF DESCRIPTION OF THE DRAWING

For a better and more complete understanding of the present invention together with other objects and advantages, the following description should be considered together with the drawing in which;

FIG. 1 is a top view of a small motor sub-assembly using the invention;

FIG. 2 is a front view of the sub-assembly shown in FIG. 1 with a partial cut-away section;

FIG. 3 is a fragmentary perspective view of a portion of the terminal board of the invention, showing a coil end and a terminal in position to be inserted into the terminal board;

FIG. 4 is a cross-sectional view of a portion of the terminal board together with an inserted terminal, the end of the coil winding and an inserted wire for making external connections; and FIG. 5 shows the portion of the terminal board which may be broken away to facilitate mounting of the sub-assembly.

DESCRIPTION OF THE PREFERRED EMBODIMENT

The invention disclosed herein relates to a terminal board and the manner in which it may cooperate with a subassembly on which a coil is to be wound such that the terminal board is retained on the sub-assembly by a first means before the coil is wound and wherein the terminal board is retained by a second means after the coil is wound. The terminal board includes means for capturing and retaining the ends, and/or taps, of wound coils. The invention also discloses a terminal means for providing electrical continuity between the coil ends and external leads. While the invention disclosed herein may find utility in a wide variety of applications including transformers, relays and inductances, it is disclosed more specifically with respect to a small universal motor.

Considering now more specifically FIGS. 1 and 2, there will be seen therein a sub-assembly illustrated generally as 101 comprising a lamination stack 102 held together by a pair of rivets 103. The lamination stack 102 also has holes 105 which may extend through the entire lamination stack 102 or which may penetrate only a portion of the lamination stack 102 depending upon the specific means which may be used for mounting the sub-assembly in a housing (not shown). The lamination stack 102, as viewed in FIG. 1, is generally circular in cross section and includes a pair of pole pieces 106 and 107 through which magnetic flux is directed across an armature (not shown) which is subsequently placed in the cavity 108. In order to generate the magnetic flux, coils will be wound in the pairs of winding slots 109 and 110. Machines for efficiently and expeditiously winding coils in the winding slots 109 and 110 are well known.

Mounted on the lamination stack 102 is a terminal board illustrated generally as 115 and comprising a plurality of terminal wells 116 which are shown in some additional detail in FIGS. 3 and 4. The terminal board 115 has arms 117 which extend from the terminal well area and follow the general outline of the lamination stack including the winding slots 109 and 110. The arms 117 terminate in ribs 118 which join wings 119.

Prior to the winding of the coils in the winding slots 109 and 110, it is conventional to place insulating slot liner in the slots 109 and 110. In order to avoid confusion in the drawing, such slot liners have been omitted since their use is conventional and well known. When the coil 120 (not shown in FIGS. 1 and 2, but shown in FIGS. 3 and 5) is wound in the winding slots 109 and 110, the individual turns thereof make physical contact with the ribs 118 and help to retain the terminal board 115 on the lamination stack 102. The wings 119 serve to retain the coil 120 away from the armature cavity 108.

The terminal board 115 includes a pair of bosses 121 which extend into the mating holes 105 as a press fit and retain the terminal board 115 on the lamination stack 102 prior to the winding of the coil 120 in the winding slots 109 and 110. As will be seen later, the bosses 121 may be knocked off after the terminal board 115 is retained in its position by the coil 120. The bosses may have holes 104.

As may be seen more clearly in FIG. 3, each terminal well 116 is generally rectangular in cross section and has "Y" shaped slots 126 in opposite walls 127 and 128 of the terminal wells 116. The base 129 of the Y slot 126 is proportioned so that it will snuggly grasp and retain an end 130 of coil 120. That is, the base 129 of the slot 126 has a width which is approximately equal to the diameter of the wire 130 which is an end, or center tap, of the wire of the coil 120.

When the coil winding machine (not shown) starts the winding of a coil, the starting end 130 of the coil is laid into one of the Y slots 126 of one of the terminal wells 116. The machine will wind the coil 120 and if a center tap is used, a loop of wire will be brought out and laid into another base 129 of a slot 126 of another terminal well 116. When the coil 120 is fully wound the terminal end thereof, which will be similar to wire 130, will be laid into another slot 126 and urged to the base 129 thereof in another terminal well 116. Subsequent to this placement of the coil end, the end 130 will be severed from the supply spool. The snug fit between the coil end 130 and the base 129 of the slot 126 will retain the coil end 130 in position and prevent the loosening of the last few turns of the coil 120. This retention of the coil end and maintenance of the integrity of the winding 120 eliminates the need for a subsequent manual operation to snug up the last few turns of the winding 120 and the use of auxiliary means for retaining the form of the winding 120.

Considering now more specifically FIG. 4 which constitutes a cross section of the terminal well 116 taken through the center of the Y slots 126, it will be observed that at the base of the well 116 there is an anvil 132 which is generally circular, or oval, (as seen in FIG. 1) and whose top surface is slightly below the base 129 of the slots 116. It will also be observed from FIG. 4 that the base 129 of the Y slot 126 in outer wall 128 is stepped with the lower level facing the interior of the well 116. The function of this step will be described more fully hereinafter in connection with the description of the insertion of the terminal 135 into the terminal well 116.

Upon completion of the sub-assembly 101, including winding the coil 120 and laying the coil ends and taps into slots 126, the assembly may leave the winding station and proceed to the terminal installation station. As the sub-assembly 101 is conveyed from the winding station to the terminal installation station, there is no tendency for the ends of the coils 120 to loosen inasmuch as they are securely retained within the base 129 of the Y slots 126. The coil ends 130 protrude beyond the outer wall 128 of the terminal wells 116 and the wire 130 has enamel insulation thereon. The sub-assembly 101 is automatically oriented and positioned at the terminal inserting station so that terminals 135 may be automatically inserted into any or all of the terminal wells 116 wherein it is desired to have a terminal 135. Generally speaking, the outer dimensions of the terminal 135 are such as to constitute a secure fit into the terminal well 116. In addition, the terminals 135 may be equipped with serrations 136 which coact with the interior surfaces of the well 116 to securely retain the terminal 135 within the confines of the well 116 subsequent to the insertion of the terminal 135 into the well 116. That is, the serrations 136 are oriented to permit insertion of the terminal and resist removal thereof. That is, the serrations 136 dig into and embed themselves in the plastic material of which the terminal board 115 is fabricated. The terminal 135 will be seen to have a generally "U" shape, but with a member 140 extending downward from an upper arm of the U towards the interior base of the other arm of the U. Thus, the terminal 135 is seen to comprise a single piece of metal shaped to form a first wall 137, a base 138, a second wall 139 and an interior member 140. The terminal 135 has a cut-away portion 141 which is relatively wide in the base member 138 and narrow into slots 142 and 143 in the walls 137 and 139, respectively. The slots 142 and 143 are sized and shaped so that as the terminal 135 is pressed into the terminal well 116 these slots will engage the wire 130, pierce the enamel insulation on the wire 130 and make a good electrical contact between the wire 130 and the terminal 135. The cut-away portion 141 in the base 138 allows the terminal 135 to straddle the anvil 132 as the terminal 135 is pressed into the terminal well 116. As the slots 142 and 143 first engage the wire 140, the portion of the wire 130 within the well 116 will be pressed down into contact with the upper surface of the anvil 132 and the base 129 of the slots 126. Further movement of the terminal 135 into the well 116 will cause the piercing of the enamel insulation already mentioned. In addition, prior to the full insertion of the terminal 135 into the well 116, the portion of the wire 130 which extends outside the outer wall 128 will be sheered off by a means not shown. The final seating of the terminal 135 within the well 116 will tend to draw the end of the wire 130 towards the interior of the well 116. That is, the end of the wire 130 will not protrude beyond the outer surface 128 of the terminal board 115. This provides protection against accidental contact of the coil end 130 with a metal housing within which the subassembly 101 may be placed. The stepped shape at the base 129 of the Y slot in the wall 128 assists in pulling in the end of the wire 130. When the terminal 135 is fully inserted in the well 116, a portion of the wire 130 rests on the anvil 132. The wire 130 is also securely gripped within the slots 142 and 143 of the terminal 135 to make good electrical contact therewith. If desired, the anvil 132 could include a slot having a width approximately equal to the wire diameter.

In order to make electrical connections from an external power source to the coil 120, a wire 145 is inserted into the terminal 135 as shown in FIG. 4. The stripped and tined end 146 of the wire 145 is securely retained within the terminal 135 by the spring action of the interior member 140. That is, the end 147 of the interior member 140 is positioned so close to the wall 137 that insertion of the wire end 146 therebetween will urge the end 147 of member 140 away from wall 137 and the spring tension of the interior member 140 will retain the wire end 146 in position. The shape and angle of contact of the interior member 140 and the wire end 146 are such as to make it difficult to remove the wire 145 once its end 146 has been inserted into the terminal 135. The anvil supports the wire 130 and prevents the insertion of the wire 146 from disturbing the wire 130. That is, the anvil 132 and the wire 130 on it provide a down stop for the wire end 146.

As previously mentioned, the terminal board 115 is first held on the lamination stack 102 by means of the bosses 121 which press fit into the holes 105 (see FIGS. 2 and 5). Subsequently, the winding of the coil 120 over the ribs 118 provides an alternate means for holding the terminal board in its position on the lamination stack 102. Accordingly, after the winding of the coils 120, the bosses 121 can be knocked off the terminal board 115. Therefore, if it is convenient or expedient to do so to mount the assembly 101 to a frame or within a housing (not shown), a bolt 150 may be inserted into the holes 104 of the terminal board and forced therein to knock off the boss 121 of the terminal board 115 and push it through the holes 105 of the lamination stack 102 and discard it. The bolt 150 can then be used to attach the sub-assembly 101 to a housing.

Because the terminal board 115 is first held on the lamination stack 102 by means of the bosses 121 interacting with the holes 105 and that the terminal board is later held by the coil 120 acting with the ribs 118, there is no need for any portion of the terminal board 115 to extend beyond the boundaries of the lamination stack 102. Accordingly, there are no overhanging pieces, arms, legs, or supports which infringe on the winding slots 109 or 110 or the armature cavity 108 which would complicate the molding of the terminal board 115 and/or possibly interfere with the winding of the coil 120. Since no part of the terminal board 115 extends beyond the outer perimeter of the lamination stack 102, no special provision has to be made in the housing into which the sub-assembly is mounted.

When the structure of the present invention is used with small motors, an auxiliary terminal board for supporting the brushes, which contact the armature, may be provided and projections from the auxiliary terminal board may plug directly into one or more of the terminals 135 inserted into the terminal well 116 in order to make connections from the brushes to the coil.

If conditions or circumstances are such as to make it expedient to do so, a terminal board 115 may be placed on both sides of the lamination stack 102. However, under normal conditions only one terminal board would be used. The fact that the terminal board comprises a single piece including the terminal wells 116, the arms 117, the ribs 118 and the wings 119, there is only a single piece to be placed in position on the lamination stack 102, this will provide a simpler and more economical assembly. The cost of assembly is further reduced because the coil ends can be retained in their proper position prior to the insertion of the terminal 135 and the terminal 135 does not have to be inserted at the coil winding station.

While there has been shown and described what is considered at present to be the preferred embodiment of the invention, modifications thereto will readily occur to those skilled in the related arts. For example, the terminal board could be modified for use with a transformer stack, a solenoid or other assemblies including a coil winding. It is believed that no further analysis or description is required and that the foregoing so fully reveals the gist of the present invention that those skilled in the applicable arts can adapt it to meet the exigencies of their specific requirements. It is not desired, therefore, that the invention be imited to the embodiments shown and described, and it is intended to cover in the appended claims all such modifications as fall within the true spirit and scope of the invention.

What is claimed is:

1. An assembly comprising in combination:
   a. a magnetizable stator assembly for a fractional horsepower motor made of a plurality of laminated elements having congruent outlines, stacked together and configured to include a central opening to accommodate a rotor;
   b. a preformed and separable terminal board configured to lie within the outline of said congruent elements without infringing on the area of said central opening and overlaying the outermost of said stack of laminated elements;
   c. said terminal board including a first retaining means, a wing section and a facility for accommodating a plurality of terminals;
   d. said stator assembly having at least one hole in the body thereof; and wherein
   e. said first retaining means includes a boss on said terminal board for mating with said hole in said stator assembly with a press fit to retain said terminal board on said stator assembly in said overlaying relationship.

2. The combination as set forth in claim 1, wherein said terminal board has terminal receiving wells with a slot in the wall of said wells for retaining terminations of a coil wound on the combination of said stator assembly and said terminal board.

3. The combination as set forth in claim 1 and wherein said terminal board includes second retaining means cooperating with said stator assembly for retaining said terminal board in said overlaying relationship with said stator assembly and independent of said first retaining means.

4. The combination as set forth in claim 3, wherein said second retaining means includes engaging means for co-operating with a coil wound on the combination of said stator assembly and said terminal board.

5. The combination as set forth in claim 4 and wherein said wing section retains the windings of the coil away from said central opening.

6. The combination as set forth in claim 1, wherein said boss constitutes a breakaway portion of said terminal board.

7. The combination as set forth in claim 6 and including second retaining means for retaining said terminal board on said stator assembly.

8. The combination as set forth in claim 7, wherein said second retaining means comprises a bolt for breaking away said boss and passing into said hole.

9. An assembly comprising in combination:
 a. a magnetizable stator assembly for a fractional horsepower motor made of a plurality of laminated elements having congruent outlines, stacked together and configured to include a central opening to accommodate a rotor;
 b. a preformed and separable terminal board configured to lie within the outline of said congruent elements without infringing on the area of said central opening and placed in overlaying relationship with the outermost of said stack of laminated elements;
 c. said terminal board including a first retaining means, a wing section and a facility for accommodating a plurality of terminals; and wherein
 d. said first retaining means includes a breakaway portion of said terminal board.

10. The combination as set forth in claim 9, wherein said stator assembly includes a hole and said breakaway portion comprises a boss which press fits into said hole.

11. The combination as set forth in claim 10 and including fastening means for passing through said hole and breaking away said breakaway boss.

12. An assembly comprising in combination:
 a. a magnetizable stator assembly for a fractional horsepower motor made of a plurality of laminated elements having congruent outlines, stacked together and configured to include a central opening to accommodate a rotor;
 b. a preformed and separable terminal board configured to lie within the outline of said congruent elements without infringing on the area of said central opening and placed in overlaying relationship with the outermost of said stack of laminated elements;
 c. first and second means for retaining said terminal board in said overlaying relationship with said stator assembly;
 d. said first retaining means comprising breakaway mating means associated with said stator assembly; and
 e. said second retaining means comprises a member on said terminal board cooperating with a coil wound on the combination of said terminal board and said stator assembly.

13. The combination as set forth in claim 12, wherein said stator assembly includes a hole and said breakaway mating means comprises a boss that press fits into said hole.

14. The combination as set forth in claim 13 and including fastening means for passing through said hole and breaking away said breakaway boss.

* * * * *